No. 812,269. PATENTED FEB. 13, 1906.
R. E. HORTON.
WATER LEVEL GAGING INSTRUMENT.
APPLICATION FILED MAY 17, 1905.
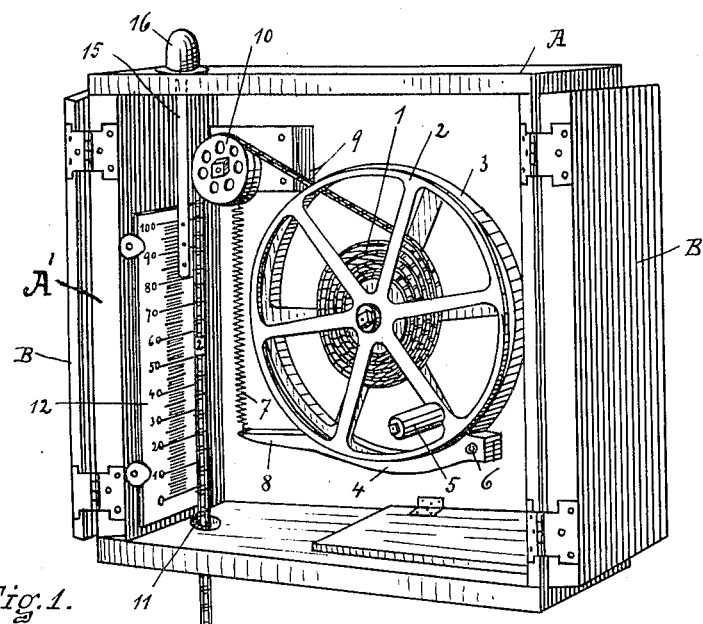
Fig. 1.
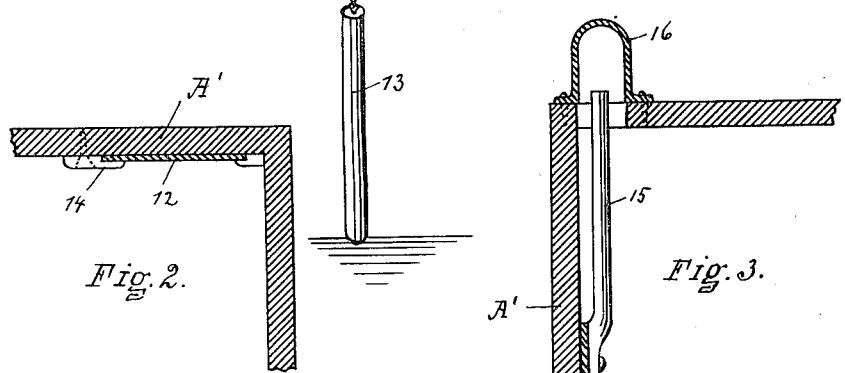
Fig. 2.
Fig. 3.
WITNESSES.
Rich. A. George
Sarah E. Clark
INVENTOR
ROBERT E. HORTON.
By Robinson, Martin & Jones
ATTORNEYS.

UNITED STATES PATENT OFFICE.

ROBERT E. HORTON, OF UTICA, NEW YORK, ASSIGNOR TO DANIEL L. MOTT, OF UTICA, NEW YORK.

WATER-LEVEL-GAGING INSTRUMENT.

No. 812,269.      Specification of Letters Patent.      Patented Feb. 13, 1906.

Application filed May 17, 1905. Serial No. 260,765.

*To all whom it may concern:*

Be it known that I, ROBERT E. HORTON, of Utica, in the county of Oneida and State of New York, have invented certain new and useful Improvements in Water-Level-Gaging Instruments; and I do hereby declare that the following is a full, clear, and exact description of the invention, which will enable others skilled in the art to which it appertains to make and use the same, reference being had to the accompanying drawings, and to the characters of reference marked thereon, which form part of this specification.

My invention relates to improvements in weight and chain gages for determining the variations in the height or level of water in streams, lakes, or ponds.

The gage consists, essentially, of a graduated scale mounted in a fixed position in a case above the water and a chain or tape of known definite length, to one end of which is attached a weight or plumb-bob, which is lowered until it touches the surface of the water, together with a reel for the chain or tape and means for operating it, in connection with other details, as will hereinafter appear. The stage or height of the water is determined by noting the position on the fixed scale of an index or marker on the chain or tape when the weight or plumb-bob touches the water-surface.

The main objects of my improvements are, first, to provide an adequate mechanism for lowering or raising the gage chain or tape and for holding it in position while the reading is being taken; second, to provide an instrument which can be easily fixed and maintained in a desired geodetic position and elevation and which can be read with precision and without liability of error; third, to provide a suitable casing and protection for the gage and mechanism which will protect it when not in use and which shall render the gage compact and portable and easy of erection in any position in which it may be desired to be used.

Figure 1 shows a perspective view of the case and mechanism with the doors for closing the front in open position and the plumb-bob or weight partially lowered. Figs. 2 and 3 are sectional details of the construction.

The case, as shown, consists of a rectangular box A, closed at the back and provided with hinged doors B at the front, which when open are adapted to afford access to the full area of the case and when closed form a complete closure for the front of the case. Mounted on a fixed pivot 1, projecting from the back of the case, is the chain or tape reel 2. This reel has on one part a face 3, adapted to receive the pressure of the brake 4, while on the other part is provided with a crank-handle 5, by means of which it may be rotated. The brake 4 is pivoted also to the back at 6 and has attached to its opposite end a spring 7. This spring 7 causes the brake 4 to bear on the periphery of the reel, and the brake will also preferably be provided with a handle portion 8, to which the operator can apply his hand in releasing the brake. The chain 9 has one end attached to the hub of the reel 2 and passes from thence over the roller 10 and is adapted to pass through the opening 11 in the bottom of the case. The periphery of the roller 10 is arranged so as to allow the chain to pass through this opening and also causes the chain to pass in close proximity to the adjustable scale-plate 12, mounted on one end of the case. On the end of the chain there is provided a weight or plumb-bob 13, which is preferably of the length to allow it to be entirely housed in suspended position within the case and between the roller 10 and the bottom of the case. The scale 12 is preferably arranged on the inner side of the end wall A' of the case and is secured adjustably in a vertical direction on the wall by clips 14. To the scale-plate 12 is attached an extension-rod 15, which projects through an opening in the top of the casing, and there is provided a removable cap 16 for covering the opening in the top and inclosing the end of the rod 15, whether it projects more or less above the plane of the top of the case. The scale 12 has a length of, say, one foot or other chosen unit and is subdivided to hundredths of a foot or other suitable subdivision, beginning with zero at the lower end of the scale. The chain or tape 9 is subdivided into feet or other suitable units beginning near the end attached to the reel. The foot or other marks are numbered consecutively from near the reel end outwardly toward the weight 13 as far as necessary. The casing is secured on a fixed support, as a bridge, abutment, pier, post or other suitable support, at or over the surface of the water to be measured from time to time. The cap 16 being removed, the position of the scale 12 may be accurately adjusted to correspond with known bench-marks or otherwise. When adjusted to the right position, it is secured by the clamps 14 and the cap 16 replaced. The scale when fixed constitutes as to each of its divisions fixed observation-marks.

To use the instrument, the operator opens the front of the case and pressing down on the spring end of the brake 4 allows the reel to pay the chain and weight out until a point is reached where the end or other known mark on the weight reaches the surface of the water to be gaged. The reading is then taken by reading, first, the number on the tape or chain and the fractional parts on the scale 12 opposite the unit division on the chain. When the reading has been taken, the chain or tape is returned to the reel and the weight drawn into the casing by the operator releasing the brake and turning the reel by means of the handle 5. The tension of the spring 7 will necessarily be sufficient to maintain the reel against rotation when the weight and chain are paid out to substantially their full length.

This device furnishes a most convenient manner of determining the variations in the level of the water in streams, lakes, and otherwise, and the arrangement is such that the reading may be very conveniently taken with little or no liability to error.

It is evident that numerous modifications and changes in and from the construction described may be made without departing from the spirit of my invention.

What I claim as new, and desire to secure by Letters Patent, is—

1. The combination in a gaging instrument of the character described of a casing arranged to be secured in a fixed position, a scale on the interior of the casing, a graduated gage-chain, a reel in the casing, an opening in the bottom of the casing at the foot of the scale, means for causing the gage-chain to pass from the reel in close proximity to the said scale and through the opening and means for controlling the rotation of the reel, substantially as set forth.

2. The combination in a gaging instrument of a casing adapted to be secured in a fixed position, an adjustable scale in said casing, a reel in said casing and means for controlling the movement of the reel, a graduated gage-chain adapted to be wound on the reel and passing from thence in close proximity to said scale and through an opening in the casing at the foot of the scale, substantially as set forth.

3. The combination in a gaging instrument of the character described of a casing adapted to be secured in a fixed position, a fixed observation-mark within the casing, a reel mounted in the casing, a graduated gage-chain passing in close proximation to said observation-point and thence through an opening in the bottom of the casing, and a gage-chain weight adapted to pass through said opening and be housed in the casing, substantially as set forth.

4. The combination in a gaging instrument of the character described of a casing adapted to be secured in a fixed position, an adjustable scale secured in the casing having a projecting arm extending to the exterior of the casing by means of which the position of the scale can be nicely determined, a reel mounted in the casing, a graduated gage-chain adapted to be wound on the reel and passing in close proximity to the scale and through an opening in the casing at the foot of the scale, a weight arranged on the end of the gage-chain adapted to be passed through said opening and housed in the casing, and means for operating and securing said reel in adjusted position, substantially as set forth.

In witness whereof I have affixed my signature, in presence of two witnesses, this 11th day of May, 1905.

ROBERT E. HORTON.

Witnesses:
EMMA S. HESSE,
S. I. DE VINE.